US006323289B1

(12) United States Patent
Hogt et al.

(10) Patent No.: US 6,323,289 B1
(45) Date of Patent: Nov. 27, 2001

(54) EXTRUSION PROCESS FOR ENHANCING THE MELT STRENGTH OF POLYPROPYLENE

(75) Inventors: Andreas Herman Hogt, Enschede; Bart Fischer, Leusden; Geesje Klasina Spijkerman, Deventer, all of (NL)

(73) Assignee: Akzo Nobel NV (NL)

( * ) Notice: Subject to any disclaimer, the term of this patent is extended or adjusted under 35 U.S.C. 154(b) by 0 days.

(21) Appl. No.: 09/574,372

(22) Filed: May 19, 2000

Related U.S. Application Data

(63) Continuation of application No. PCT/EP98/07219, filed on Apr. 11, 1998.

(30) Foreign Application Priority Data

Nov. 21, 1997 (EP) .................................................. 97203628

(51) Int. Cl.[7] ........................................................ C08F 8/50
(52) U.S. Cl. ........................................ 525/387; 526/232.5
(58) Field of Search .......................... 525/387; 526/232.5

(56) References Cited

U.S. PATENT DOCUMENTS

| 4,806,581 | * | 2/1989 | Walker | 524/178 |
| 5,416,169 | | 5/1995 | Saito et al. | 525/387 |
| 6,103,833 | * | 8/2000 | Hogt et al. | 525/387 |

FOREIGN PATENT DOCUMENTS

| 384431 | 11/1994 | (EP) | C08F/8/50 |
| 97/49759 | 12/1997 | (WO) | C08K/5/14 |

* cited by examiner

Primary Examiner—James J. Seidleck
Assistant Examiner—Olga Asinovsky
(74) Attorney, Agent, or Firm—Richard P. Fennelly

(57) ABSTRACT

The invention relates to a process for enhancing the melt strength of polypropylene comprising the steps of:

mixing the polypropylene with at least one peroxydicarbonate;

reacting said polypropylene and peroxydicarbonate at a temperature between 150° C. and 300° C., with the proviso that the peroxydicarbonate is not in the form of an aqueous dispersion.

14 Claims, No Drawings

EXTRUSION PROCESS FOR ENHANCING THE MELT STRENGTH OF POLYPROPYLENE

This application is a continuation application of PCT International Patent Application No. PCT/EP98/07219, filed Apr. 11, 1998, which claims priority from European Patent Application No. 97203628.9, filed Nov. 21, 1997.

BACKGROUND OF THE INVENTION

The invention pertains to a process for enhancing the melt strength of a polypropylene by mixing a peroxydicarbonate with the polypropylene and heating the polypropylene/peroxydicarbonate mixture.

Such a process is known from EP-B-0 384 431. This reference describes a process for preparing polypropylene (PP) with a branching index of less than 1 comprising (1) mixing a low decomposition temperature peroxide, such as a peroxydicarbonate, with the PP, (2) heating or maintaining the resulting mixture at a temperature from room temperature up to 120° C., and then (3) heating the PP at a temperature of 130 to 150° C. to deactivate substantially all the free radicals present in said PP. The obtained PP has a significant amount of long chain branches and has an increased weight average molecular weight giving the polymer a significant strain hardening elongational viscosity. It is mentioned that in step (3) the heating may be done by extrusion or in a fluidized bed. It is further stated that at a temperature above 120° C. an essentially linear polymer with little or no branching is obtained.

Apparently, the significant strain hardening elongational viscosity is related to an improved melt strength of the obtained PP due to long chain branching. It is only mentioned in this publication that step (3) of this process can be performed by extrusion, in the examples the entire process is carried out in a sealed reaction vessel. A disadvantage of this process is that it comprises three steps, which is undesirable in practice.

DE-A-4340194 (U.S. Pat. No. 5,416,169) describes a process for preparing PP having a high melt strength and a chain branching coefficient of 1, by mixing bis(2-ethylhexyl)peroxydicarbonate with a linear, crystalline PP, followed by heating at 70 to 150° C. In a subsequent step, the PP is taken out of the reaction vessel and is melt-kneaded. The peroxydicarbonate may be dissolved in an inert solvent before it is added to the PP. It is stated that other peroxydicarbonates, having a similar decomposition temperature, cannot be used for this purpose.

A disadvantage of this process is that it can only be performed using one specific peroxide, i.e., bis(2-ethylhexyl)peroxydicarbonate. Another drawback is that the process is performed in two steps, which is undesirable and uneconomical in practice.

It is the object of the present invention to provide a process which does not have the above-mentioned drawbacks and which process yields PP having a good melt strength.

SUMMARY OF THE INVENTION

To this end, the present invention provides a process for enhancing the melt strength of polypropylene comprising the steps of:
  mixing the polypropylene with at least one peroxydicarbonate;
  reacting said polypropylene and peroxydicarbonate at a temperature between 150° C. and 300° C., with the proviso that the peroxydicarbonate is not in the form of an aqueous dispersion in a polar medium, with at least 90% by weight of the initiator particles being smaller than 50 μm and at least 99% by weight of the initiator particles being smaller than 65 μm. Preferably, the reaction conditions are chosen such that more than 50% by weight, more preferably more than 70% by weight, and most preferably, more than 80% by weight of the peroxide is still present when the mixture of peroxide and polymer reaches a temperature of 120° C., more preferably 150° C.

DESCRIPTION OF THE PREFERRED EMBODIMENTS

In the non-prepublished patent application, now published as WO 97/49759, a process for enhancing the melt strength of a polypropylene is described, wherein a dispersion of an initiator, such as a peroxydicarbonate, in a polar medium, e.g., water, and with a particular particle size distribution, is contacted with the polypropylene and the resulting mixture is heated. This process may be carried out using an extruder.

The process according to the present invention is a process providing PP having an enhanced melt strength. Since the processing of PP frequently involves extrusion of the PP, either for pelletization in case of storage and transport or for further processing, i.e., the formation of an end product, it is a further advantage that the invention process is an extrusion process, allowing the modification of the PP, to enhance the melt strength, to be combined with said processing step.

The term "polypropylene" ("PP") refers to polymers or mixtures of polymers containing at least 50% by weight of polymerized propylene. Polymerization catalysts may be Ziegler-Natta, metallocene or other types giving stereospecific polymerization of propylene. Use may be made in this connection of homopolymers of propylene; random, alternating, or block copolymers; or random, alternating, or block terpolymers of propylene and another olefin. Generally, a propylene copolymer or terpolymer will contain one or more other olefins, such as ethylene, butene, pentene, hexene, heptene, or octene, but it may also comprise other olefinically unsaturated monomers or combinations of these, such as acrylates, styrene, styrene derivatives, acrylonitrile, vinyl acetate, vinylidene chloride, and vinyl chloride.

It is preferred here to restrict the content of olefins other than propylene to 30% by weight of the copolymer. Especially suited to be used are homopolymers of propylene, copolymers of propylene and ethylene or mixtures of polypropylene and polyethylene containing not more than 10% by weight of polymerized ethylene.

The melting point of normally solid commercially available PP is about 160–170° C. The melting point of propylene copolymers and tercopolymers in general can be lower. The process of the invention preferably is carried out at a temperature in the range of from 150 to 300° C, more preferably from 160 to 250° C., and most preferably from 170 to 225° C.

The molecular weight of the PP used can be selected from a wide range. Indicative of the molecular weight is the melt flow index (MFI). Use may be made of a PP having a MFI from 0.1 to 1000 g/10 min (230° C., 21.6 N). Preferably, use is made of a PP having a MFI from 0.5 to 250 g/10 min.

The process according to the present invention is suitably carried out in melt mixing equipment known to a person skilled in the art. Preferably, an extruder or a kneader is used. More preferably, use is made of a single or twin screw extruder. An internal mixer such as a Banbury mixer optionally coupled to an extruder may also be used.

The peroxydicarbonate may be mixed first with the PP and then the mixture may be extruded. Alternatively, the peroxydicarbonate may be added to the extruder already containing the PP by injection or spraying, or may be added together with the PP. It is preferred to introduce a solid peroxydicarbonate together with the PP into the extruder, for example, by using a feeder. The temperature setting of the extruder should allow the PP to melt, i.e. above 150° C. The screw speed typically is from about 25 to 500 rpm.

Normal residence time in the extruder is 15 sec.–30 min. The longer residence times can be achieved by using additional static mixers etc.

The extruded strand may be further processed as known to one of ordinary skill in the art. Normally, the extruded strand is fed through a water bath and granulated using a granulator. Alternatively, the extruded modified PP is formed directly into a desired end product.

It is preferred to carry out the process of the present invention in an atmosphere of an inert gas, such as nitrogen or argon. Preferably, nitrogen is used.

Solid as well as liquid peroxydicarbonates may be used in the process according to the present invention. A solution of a peroxydicarbonate in an inert solvent, such as isododecane, or in the form of frozen flakes, may also be used. Suitable inert solvents are known to one skilled in the art. It is preferred to use a solid peroxydicarbonate, in the form of, for example, flakes, finely divided particles (powder), or a liquid peroxydicarbonate, optionally adsorbed on or absorbed in a suitable carrier, such as silica or polypropylene powder or pellets. The use of a solid peroxydicarbonate permits a higher storage and processing temperature. Such higher temperature is beneficial when the peroxydicarbonate is to be introduced into an extruder using (loss-in-weight) feeders.

The peroxydicarbonates used in the process of the present invention have a half life of one hour at temperatures around 65° C.

Suitable examples of peroxydicarbonates have the formula the formula $R^1$—OC(O)OOC(O)O—$R^2$, wherein $R^1$ and $R^2$ are independently selected from the group consisting of $CH_3$, 2-i-$C_3H_7O$—$C_6H_4$, $C_2H_5CH(CH_3)$, 4—$CH_3$—$C_6H_4$, $Cl_3CC(CH_3)_2$, $C_7H_{15}$, c-$C_6H_{11}CH_2$, 3-t-$C_4H_9$—$C_6H_5$, $Cl_3Si(CH_2)_3$, $C_6H_5$, $CH_3CH(OCH_3)CH_2CH_2$, $C_6H_5OCH_2CH_2$, $C_6H_5CH_2$, Z—$C_8H_{17}CH$=$CH(CH_2)_8$, 2-$CH_3$—$C_6H_4$, $(CH_3)_2CHCH_2CH(CH_3)$, 3,4-di-$CH_3$—$C_6H_3$, $Cl_3C$, $CHCH(Cl)$, $ClCH_2$, $[C_2H_5OC(O)]_2CH(CH_3)$, 3,5-di-$CH_3$—$C_6H_3$, $C_8H_{17}$, $C_2H_5$, $C_{18}H_{37}$, 2-oxo-1,3-dioxolan-4-$CH_2$, $C_2H_5CH(Cl)CH_2$, 4-$CH_3O$—$C_6H_4$, i-$C_4H_9$, $CH_3SO_2CH_2CH_2$, $C_{12}H_{25}$, $C_6H_5CH(Cl)CH_2$, $H_2C$=$CHC(O)OCH_2CH_2$, 4-$NO_2$—$C_6H_4$, $C_4H_9$, $C_{10}H_{21}$, $C_4H_9CH(C_2H_5)CH_2$, $H_2C$=$CHCH_2$, 2-Cl-c-$C_6H_{10}$, $H_2C$=$C(CH_3)CH_2$, c-$C_6H_{11}$, $ClCH_2CH_2$, 4-[$C_6H_5$—N=N]—$C_6H_4CH_2$, $C_{16}H_{33}$, 1-naphtyl, 4-t-$C_4H_9$—$C_6H_{10}$, 2,4,5-tri-Cl-$C_6H_2$, $Cl(CH_2)_3$, $C_{14}H_{29}$, 9-fluorenyl, 4-$NO_2$—$C_6H_4CH_2$, 2-i-$C_3H_7$—$C_6H_4$, $CH_3OCH_2CH_2$, $H_2C$=$C(CH_3)$, 3-$CH_3$—$C_6H_4$, $BrCH_2CH_2$, 3-$CH_3$-5-i-$C_3H_7$—$C_6H_3Br_3CCH_2$, $C_2H_5OCH_2CH_2$, 4-$CH_3OC(O)$—$C_6H_4$, $H_2C$=$CH$, i-$C_3H_7$, 2-$C_2H_5CH(CH_3)$—$C_6H_4$, $Cl_3CCH_2$, $C_5H_{11}$, c-$C_{12}H_{23}$, 4-t-$C_4H_9$—$C_6H_4$, $C_6H_{13}$, $C_3H_7$, $CH_3OCH_2CH_2$, $C_6H_{13}CH(CH_3)$, $CH_3OC(CH_3)_2CH_2CH_2$, $C_3H_7OCH_2CH_2$, $CH_3OCH_2CH(CH_3)$, 2-i-$C_3H_7$-5-$CH_3$-c-$C_6H_9$, $C_4H_9OCH_2CH_2$, t-$C_4H_9$, $(CH3)_3CCH_2$, wherein i=iso, t=tertiary, Z=cis, and c=cyclic. More preferred are bis(4-tert-butylcyclohexyl) peroxydicarbonate, dicetyl peroxydicarbonate, and dimyristyl peroxydicarbonate, which peroxides are solid at room temperature, and diisopropylperoxydicarbonate, di-n-butylperoxydicarbonate and bis(2-ethylhexyl)peroxydicarbonate, which are liquid at room temperature, either pure or as a solution in isododecane. Optionally, a combination of peroxydicarbonates or peroxydicarbonates and other peroxides may be employed in order to influence the melt flow index of the (co)polymer and/or enhance the degree of modification of the (co) polymer.

The quantity of peroxydicarbonate to be used will be dependent on the desired degree of PP modification and on the PP employed. Preferably, use is made of peroxydicarbonate concentrations in the range of 0.1 to 10 meq (=milliequivalents=millimoles of peroxide) per 100 g PP, more preferably in the range of 0.25 to 5 meq/100 g PP.

In another embodiment of the present invention, the modification process is carried out in the presence of a coagent in order to influence the melt flow index of the (co)polymer and/or enhance the degree of modification of the co)polymer.

A coagent is generally understood to be a polyfunctional reactive additive such as a polyunsaturated compound which will react rapidly with polymer radicals, will overcome steric hindrance effects and minimize undesirable side reactions. Further information about coagents is set forth in Rubber Chemistry and Technology, Vol. 61, pp. 238–254 and W. Hofmann, Progress in Rubber and Plastics Technology, Vol. 1, No. 2, March 1985, pp. 18–50. The term "coagent" has the same meaning as given in these publications.

A wide variety of useful coagents are commercially available including di- and triallyl compounds, di- and tri(meth)acrylate compounds, bismaleimide compounds, divinyl benzene, 1,3-diisopropenylbenzene and its oligomer, vinyl toluene, vinyl pyridine, parachinone dioxime, 1,2-cis-polybutadiene and their derivatives. Particularly preferred coagents include triallyl cyanurate, triallyl isocyanurate, ethylene glycol dimethacrylate and trimethylolpropane trimethacrylate.

The incorporation of an effective amount of one or more of these coagents into the (co)polymer, prior to or during the reaction with the present tend to influence the melt flow index and molecular weight of the modified (co)polymer.

Although the process of the present invention can be carried out as a batch internal mixer (Banbury) process, preferably it is performed as a continuous process.

The PP obtained using the process according to the present invention may be processed into an end product without any further adaptations if so desired. The modified PP can be processed into the desired end product in all kinds of ways known to the skilled person, with the processing conditions generally being dependent on the material and equipment employed.

Optionally, the modified PP may be purified, modified or moulded, in one or more process steps, prior to its final processing. Thus, there may be further modification using another polymer or monomer in order to enhance the end product's compatibility with other materials.

Alternatively, the modified PP may be degraded or, on the contrary, crosslinked slightly, to increase its processability and/or applicability.

Generally, to achieve the desired end conventional adjuvants, in an amount known to one skilled in the art, such as antioxidants, UV-stabilizers, lubricants, antidegradants, foaming agents, nucleating agents, fillers, pigments and/or antistatic agents are added to the PP. These adjuvants can be added to the PP before as well as during or after the modifying step according to the invention. For example, a blowing agent can be added or gas can be injected into the extruder before, during or after the modification, in order to produce foamed PP. Preferably, a stabilizer, e.g., one or more antioxidants, is added in order to render harmless any free radicals still present in the obtained PP as well as any radicals which may be formed later from unreacted peroxide and/or subsequent processing under air/oxygen. In a typical experiment from 0.01 to 1.0 parts per hundred parts of PP of an antioxidant are used.

The PP obtained by the invention process does not show a substantial difference in weight average molecular weight. Only peroxydicarbonates have been found to give the desired enhanced melt strength in the process of the present invention. Diacyl peroxides and peresters did not give such improvement in PP melt strength. While not wishing to be bound by any particular it is believed that the improvement in melt strength is caused by modification of the PP due to the formation of alkylcarbonate-polymer adducts, with the alkylcarbonate groups originating from the peroxydicarbonate used.

The PP obtained by the process according to the present invention may be further processed, for example, by foaming, foam moulding, extrusion, injection moulding, blow moulding, extrusion coating, profile extrusion, or thermoforming. The modification reaction with peroxide may also be performed during such processing.

The invention is illustrated by the following Examples.

EXPERIMENTAL

The following materials and methods are employed in the Examples:

| Polypropylene: | |
|---|---|
| Hostalen ® PPN 1042 | copolymer of polypropylene (granules), from Hoechst |
| Novolen ® 3200HX | random polypropylene (granules), from BASF |
| Peroxides: | |
| Trigonox ® EHP-C75 | solution of 75% bis(2-ethylhexyl)-peroxydicarbonate in isododecane, from Akzo Nobel |
| Trigonox NBP-C50 | solution of 50% dibutyl peroxydicarbonate in isododecane, from Akzo Nobel |
| Perkadox ® 16 | bis(4-tert-butylcyclohexyl) peroxydicarbonate (pure), from Akzo Nobel |
| Perkadox 26 | dimyristyl peroxydicarbonate (pure), from Akzo Nobel |
| Liladox ® 90 P | dicetyl peroxydicarbonate (90%), from Akzo Nobel |
| Miscellaneous: | |
| Perkalink ® 300 | triallyl cyanurate (coagent), from Akzo Nobel |
| Irganox ® 1010 | antioxidant, from Ciba Geigy |

PROCEDURE A

Mixing procedure:

The proper amount of the peroxydicarbonate and the antioxidant were added to 300 g of polypropylene powder in a 3 liter bucket and tumble-mixed by hand for 5 minutes at room temperature. Compounds were extruded immediately after mixing.

Compounding procedure:

All compounds were melt-modified by extrusion in a Haake "TW100" twin screw extruder with intensive mixing screws attached to a Haake "Rheocord System 40". During the experiment nitrogen was passed in counterflow from the hopper up through the feeder.

The extruder comprised a barrel housing four consecutive temperature chambers, wherein the first chamber had a temperature of 170° C. the second 180° C., the third 180°°C. and the fourth chamber 190° C. The screw speed was 50 rpm. The extruded strand was fed through a water bath and granulated with an Automatic "ASG5" granulator.

PROCEDURE B

Modification procedure Modification experiments were carried out in a Buchi 150 ml RVS laboratory autoclave ('special', type BEP280).

The initiator was diluted to 33% with isododecane and Primol® 352. The autoclave was filled with 50 grams of polymer/anti-oxidant mixture and after closing, flushed with nitrogen (3 bar) followed by vacuum sucking (3 times) to avoid the presence of oxygen.

Then, the autoclave was heated up (continuous nitrogen flow, anchor stirrer speed: 150 rpm). At a polymer temperature of 155° C. (measured by means of a PT100 thermocouple, directly into the polymer), the proper amount of peroxide/solvent was injected into the autoclave. The autoclave was further heated up to 230° C. during 5 minutes. The reaction mixture was molten after approximately 15 minutes (total experimental time) as measured by torque increase. Then the reaction mixture was removed, cooled and granulated.

PROCEDURE C

The proper amount of the peroxydicarbonate and the antioxidant were added to polypropylene homopolymer powder and tumble-mixed at room temperature. This mixture was blended with the PP homopolymer powder and dosed to the extruder or dosed separately together with the PP copolymer granules.

All compounds were melt-modified by extrusion in a Werner & Pfleiderer ZSK 30 twin screw extruder.

The extruder comprised of a barrel housing with four consecutive temperature chambers, wherein the first chamber had a temperature of 100° C., the second and third 180° C. and the fourth chamber 190° C.

The compounds were fed into the first chamber of the extruder. During the experiment nitrogen was passed in counterflow from the hopper up through the feeder. The screw speed was 200 rpm.

The extruded strand was fed through a water bath and granulated with an "Automatic ASG5" granulator.

Test procedures:

MFI (Melt Flow Index), characterizing the flow behavior of a PP melt, was measured with a Göttfert Melt Indexer (model MP-D) according to DIN 53735 and ASTM 1238 (230° C., 21.6 N load).

Die swell, i.e. the degree to which the extrudate swells in a direction perpendicular to the direction of extrusion after it leaves the die, due to the elasticity of the PP melt, was determined by measuring the thickness of the strand coming out of the Melt Indexer and subtracting the nozzle diameter (2.1 mm) and is the mean value of ten measurements in mm. In the evaluation of the modified polypropylene the die swell was usually found to be proportional to the melt strength.

Melt strength, i.e. the ability of a melt of PP to withstand a tensile elongation or stretching without breaking, was measured using a Göttfert Rheotens attached to a Göttfert Rheograph 2001 capillary rheometer (190° C., speed 0.5 mm/s, acceleration 24 mm/s2, strand length 70 mm).

In Tables 1 and 2, data on Comparative Examples A–G, preparation of PP without using a peroxydicarbonate, and Examples 1–17 according to the process of the present invention are presented (comparative examples C and D are controls with solvent without peroxide). The amounts of peroxide used are expressed as milliequivalents (mmol peroxide groups) of peroxide per hundred gram of PP (meq/100 g PP).

The Examples show an increased die swell and melt strength as compared with PP prepared without using a peroxydicarbonate.

The increased die swell is always related to the improvement of the elastic viscosity and melt strength.

In Table 2 data on homo-PP, co-PP and random-PP Examples are shown as obtained following procedure C (Examples 15–17, Comparative Examples F–G)

In procedure C, where a Wemer & Pfleiderer ZSK 30 twin screw extruder is used, a PP extrusion process on production scale was simulated where within 30 seconds residence time the compounds are melt-modified. During the extrusion process the temperature of the compound increases from approximately 20° C. (hopper) to approximately 190° C. at the end of the extruder. In this process the peroxydicarbonate decomposes according to the Arrhenius equation dependent on the temperature and residence times in the different temperature chambers of the extruder.

Arrhenius equation:

$$K_d = A \cdot e^{-Ea/RT}$$

where $K_d$=the rate constant for the dissociation in $s^{-1}$

A=the Arrhenius frequency factor in $s^{-1}$ (for Liladox 90P:3.02E+15)

Ea=the activation energy for the peroxydicarbonate in J/mole (for Liladox 90P:124.3E+3)

R=8.3142 J/mole.K

T=the temperature in K

The concentration of the initiator at any time can be calculated from the equation:

$$[I] = [I_o] \cdot e^{-K_d \cdot t}$$

where $[I_o]$=the original initiator concentration $[I]$=the initiator concentration at time t t=the time in seconds Table 3 shows the amount of reacted peroxydicarbonate as a function of the temperature and residence time in the extruder as calculated by using the above equations. The compound temperature is taken as the mean temperature of the barrel temperature and a linear temperature profile (20° C. to 190° C. in 30 seconds).

In this procedure more than 80% w/w of the peroxydicarbonate reacts with the PP above 120° C. Therefore the enhancement of the melt strength of PP, as a result of the reaction of peroxydicarbonate with PP, in an extrusion process mainly takes place above 120° C.

TABLE 1

Comparative samples A–B and Examples 1–12

PROCEDURE A

| Examples | | A | B | 1 | 2 | 3 | 4 | 5 | 6 | 7 | 8 | 9 | 10 | 11 | 12 |
|---|---|---|---|---|---|---|---|---|---|---|---|---|---|---|---|
| PP Borealis HC00A1-B1 | Phr | 100 | 100 | 100 | 100 | 100 | 100 | 100 | 100 | 100 | 100 | 100 | 100 | 100 | 100 |
| Trigonox EHP-C75 | Phr | | | 0.46 | 0.92 | | | | | | 0.94 | | | | |
| Trigonox NBP-C75 | Phr | | | | | | | | | | | | | | |
| Perkadox 16 | Phr | | | | | | | | | | 0.42 | | | | |
| Liladox 90P | Phr | | | | | 0.16 | 0.63 | 1.26 | 3.14 | | | | 0.63 | 1.26 | 0.63 |
| Perkadox 26 | Phr | | | | | | | | | | | 0.54 | | | |
| Perkalink 300 | Phr | | | | | | | | | | | | 0.63 | 1.26 | 0.63 |
| Irganox 1010 | Phr | 0.1 | 0.1 | 0.1 | 0.1 | 0.1 | 0.1 | 0.1 | 0.1 | 0.1 | 0.1 | 0.1 | 0.1 | 0.1 | 0.1 |
| Meq. Peroxide | meq peroxide 100 g PP | | | 1 | 2 | 0.25 | 1 | 2 | 5 | 2 | 1 | 1 | 1 | 2 | 1 |
| Rheological properties | | | | | | | | | | | | | | | |
| MFI | g/10 min | 2.6 | 2.1 | 1.6 | 1.2 | 1.8 | 1.2 | 0.9 | 0.7 | 1.0 | 1.7 | 1.8 | 1.4 | 1.0 | 1.2 |
| Die swell | Mm | 2.5 | 2.8 | 3.8 | 4.8 | 3.7 | 4.5 | 4.4 | 4.5 | 4.5 | 4.2 | 4.5 | 4.2 | 4.7 | 4.3 |
| Melt strength | CN | 1.9 | 23 | 33 | 33 | 25 | 38 | 39 | 40 | 36 | 35 | 33 | 36 | 35 | 36 |

TABLE 2

Comparative Examples C–G and examples 13–17

| Examples | | | PROCEDURE B | | | | | PROCEDURE C | | | |
|---|---|---|---|---|---|---|---|---|---|---|---|
| | | | C | D | 13 | 14 | 15 | F | G | 16 | 17 |
| Homo-PP | Borealis HC00A 1-B1 | phr | 100 | 100 | 100 | 100 | 100 | 9.5 | 9.5 | 9.5 | 9.5 |
| Co-PP | Hostalen PPN 1042 | phr | | | | | | 90.5 | | 90.5 | |
| Random-PP | Novolen 3200HX | phr | | | | | | | 90.5 | | 90.5 |
| Liladox 90 P | | phr | | | | | 1.26 | | | 1.26 | 1.26 |
| Tx EHP (33% in isodod) | | phr | | | | 1.05 | | | | | |
| Tx EHP (33% in primol) | | phr | | | | | 1.05 | | | | |
| Isododecane | | phr | 0.7 | | | | | | | | |
| Primol 352 | | phr | | 0.7 | | | | | | | |
| Irganox 1010 | | phr | 0.1 | 0.1 | 0.1 | 0.1 | 0.1 | 0.1 | 0.1 | 0.1 | 0.1 |
| Meq. Peroxide | Meq peroxide / 100 g PP | | | | 2 | 2 | 2 | | | 2 | 2 |
| Rheological properties | | | | | | | | | | | |
| MFI | g/10 min | | 2.7 | 2.6 | 2.2 | 2.4 | 1.3 | 2.0 | 1.5 | 2.2 | 1.7 |
| Die swell | Mm | | 2.9 | 2.8 | 3.4 | 3.2 | 4.4 | 2.4 | 2.3 | 3.6 | 3.5 |
| Melt strength | CN | | 26 | 26 | 30 | 29 | 31 | | | | |

TABLE 3

Reacted peroxydicarbonate as a function of the temperature and residence time in the extruder

| Residence time seconds | Barrel temperature profile °C. | Linear temperature profile °C. | Mean temperature profile °C. | Peroxydicarbonate reacted % w/w |
|---|---|---|---|---|
| 0 | 100 | 20 | 20* | 0 |
| 5 | 180 | 48 | 114 | 9 |
| 7 | 180 | 62 | 121 | 20 |
| 10 | 180 | 77 | 128 | 51 |
| 15 | 180 | 105 | 142 | 93 |
| 20 | 180 | 133 | 156 | 100 |
| 30 | 190 | 190 | 190 | 100 |

*temperature compound in hopper (time = 0)

The invention is not limited to the above description, the requested rights are rather determined by the following claims.

We claim:

1. A process for enhancing the melt strength of polypropylene comprising the single step of reacting polypropylene with at least one peroxydicarbonate, in a reaction vessel at a temperature above 150° C. and up to 300° C., with the proviso that the peroxydicarbonate is not in the form of an aqueous dispersion in a polar medium with at least 90% by weight of the initiator particles being smaller than 50 $\mu$m and at least 99% by weight of the initiator particles being smaller than 65 $\mu$m, wherein the melt strength of the polypropylene is enhanced and whereby on removal from the reaction vessel a modified polymer malt is obtained.

2. The process according to claim 1, wherein the peroxydicarbonate is reacted with molten polypropylene.

3. The process according to either claim 1 or claim 2, wherein the process is conducted in an extruder.

4. The process according to claim 2, wherein the temperature is from 160 to 250° C.

5. The process according to claim 4, wherein the temperature is from 170 to 225° C.

6. The process according to either claim 1 or claim 2, wherein the peroxydicarbonate has a half life of one hour at temperatures around 60° C.

7. The process according to either claim 1 or claim 2, wherein the peroxydicarbonate has the formula $R^1$—OC(O) OOC(O)O—$R^2$, wherein $R^1$ and $R^2$ are independently selected from the group consisting of $CH_3$, 2-i-$C_3H_7O$—$C_6H_4$, $C_2H_5CH(CH_3)$, 4-$CH_3$—$C_6H_4$, $Cl_3CC(CH_3)_2$, $C_7H_{15}$,c-$C_6H_{11}CH_2$, 3-t-$C_4H_9$—$C_6H_5$, $Cl_3Si(CH_2)_3$, $C_6H_5$, $CH_3CH(OCH_3)CH_2CH_2$, $C_6H_5OCH_2CH_2$, $C_6H_5CH_2$, Z—$C_8H_{17}CH$=$CH(CH_2)_8$, 2-$CH_3$—$C_6H_4$, $(CH_3)_2CHCH_2CH(CH_3)$, 3,4-di-$CH_3$—$C_6H_3$, $Cl_3C$, CHCH (Cl), $ClCH_2$, $[C_2H_5OC(O)]_2CH(CH_3)$, 3,5-di-$CH_3$—$C_6H_3$, $C_8H_{17}$, $C_2H_5$, $C_{18}H_{37}$, 2-oxo-1,3-dioxolan-4-$CH_2$, $C_2H_5CH$ (Cl)$CH_2$, 4-$CH_3O$—$C_6H_4$, i-$C_4H_9$, $CH_3SO_2CH_2CH_2$, $C_{12}H_{25}$, $C_6H_5CH(Cl)CH_2$, $H_2C$=$CHC(O)OCH_2CH_2$, 4-$NO_2$—$C_6H_4$, $C_4H_9$, $C_{10}H_{21}$, $C_4H_9CH(C_2H_5)CH_2$, $H_2C$=$CHCH_2$, 2-Cl-c-$C_6H_{10}$, $H_2C$=C $(CH_3)CH_2$, c-$C_6H_{11}$, $ClCH_2CH_2$, 4-[$C_6H_5N$=—N]—$C_6H_4CH_2$, $C_{16}H_{33}$, 1-naphtyl, 4-t-$C_4H_9$—$C_6H_{10}$, 2,4,5-tri-Cl—$C_6H_2$, Cl($CH_2)_3$, $C_{14}H_{29}$, 9-fluorenyl, 4-$NO_2$—$C_6H_4CH_2$, 2-i-$C_3H_7$—$C_6H_4$, $CH_3OCH_2CH_2$, $H_2C$=$C(CH_3)$, 3-$CH_3$—$C_6H_4$, $BrCH_2CH_2$, 3-$CH_3$-5-i-$C_3H_7$—$C_6H_3$, $Br_3CCH_2$, $C_2H_5OCH_2CH_2$, 4-$CH_3OC(O)$—$C_6H_4$, $H_2C$=CH, i-$C_3H_7$, 2-$C_2H_5CH(CH_3)$—$C_6H_4$, $Cl_3CCH_2$, $C_5H_{11}$, c-$C_{12}H_{23}$, 4-t-$C_4H_9$—$C_6H_4$, $C_6H_{13}$, $C_3H_7$, $CH_3OCH_2CH_2$, $C_6H_{13}CH$ ($CH_3$), $CH_3OC(CH_3)_2CH_2CH_2$, $C_3H_7OCH_2CH_2$, $CH_3OCH_2CH(CH_3)$, 2-i-$C_3H_7$-5-$CH_3$-c-$C_6H_9$, $C_4H_9OCH_2CH_2$, t-$C_4H_9$, $(CH_3)_3CCH_2$, wherein i=iso, t=tertiary, Z=cis, and c=cyclic.

8. The process according to claim 7, wherein $R^1$ and $R^2$ are independently selected from the group consisting of $CH_3$, $C_6H_5OCH_2CH_2$, 4-t-$C_4H_9$—$C_6H_{10}$, $C_{16}H_{33}$, $(CH_3)_3CCH(CH_3)CH_2CH_2$, $C_3H_7$, $C_4H_9$, c-$C_6H_{11}$, $CH_3CH$ (OCH₃)CH₂CH₂, C₃H₇, i-C₃H₇/C₂H₅CH(CH₃), C₁₀H₂₁, C₂H₅, C₁₄H₂₉, C₂H₅CH(CH₃), C₆H₅CH₂, C₁₈H₃₇ and C₄H₉CH(C₂H₅)CH₂.

9. The process according to claim 8, wherein the peroxydicarbonate is selected from the group consisting of bis(4-tert-butylcyclohexyl) peroxydicarbonate, dicetyl peroxydicarbonate, and dimyristyl peroxydicarbonate, diisopropyl peroxydicarbonate, di-n-butylperoxydicarbonate, di-sec-butylperoxydicarbonate, bis(2-ethylhexyl)peroxydicarbonate.

10. The process according to either claim 1 or claim 2, wherein the peroxydicarbonate is a solid at room temperature.

11. The process according to claim 10, wherein the liquid in a solution of either bis(2-ethylhexyl) peroxydicarbonate or dibutyl peroxydicarbonate in isododecane.

12. The process according to claim 1 wherein at least one coagent is present in the reaction mixture when the polypropylene is reacted with the peroxydicarbonate.

13. Polypropylene made by the process according to any one of claims 1–2, 4–5, 8–9, or 11–12.

14. The process for producing an extruded, melt spun or blown, moulded, thermoformed or foamed material based on a polypropylene, wherein the polypropylene, which is extruded, melt spun or blown, moulded, thermoformed or foamed is a polypropyleane that is made according to claim 13.

* * * * *

UNITED STATES PATENT AND TRADEMARK OFFICE
CERTIFICATE OF CORRECTION

PATENT NO. : 6,323,289 B1
DATED : November 27, 2001
INVENTOR(S) : Hogt et al.

It is certified that error appears in the above-identified patent and that said Letters Patent is hereby corrected as shown below:

<u>Column 10,</u>
Line 52, the recitation "4-[$C_6H_5N=-N$]–$C_6$ $H_4CH_2$" should read
-- 4-[$C_6H_5N=N$]–$C_6$ $H_4CH_2$ --.

Signed and Sealed this

Second Day of April, 2002

Attest:

JAMES E. ROGAN
Attesting Officer
Director of the United States Patent and Trademark Office